Sept. 1, 1964 R. J. McCRORY ETAL 3,146,940
REVERSE LEAKAGE SEAL FOR RECIPROCATING PARTS
Filed April 8, 1960 3 Sheets-Sheet 3

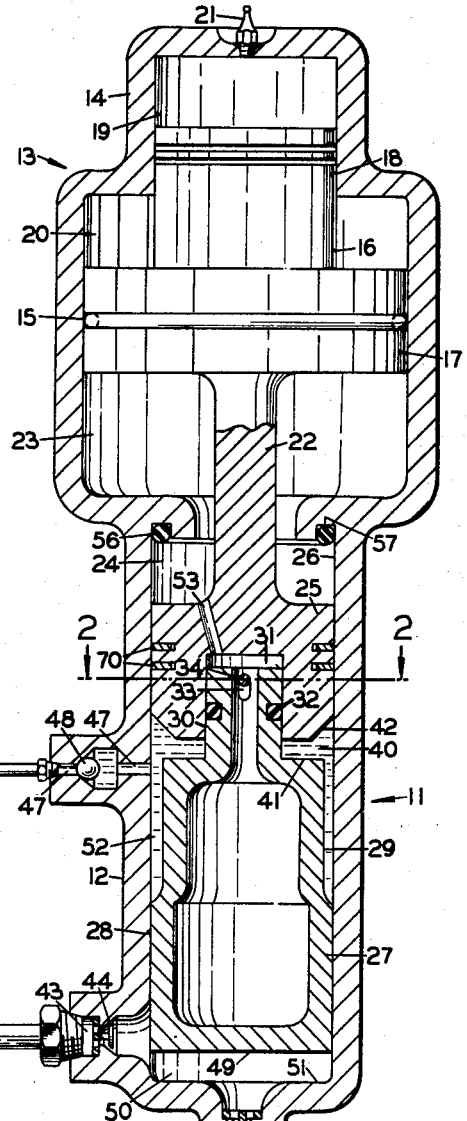
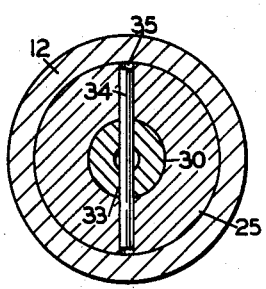
FIG. 2
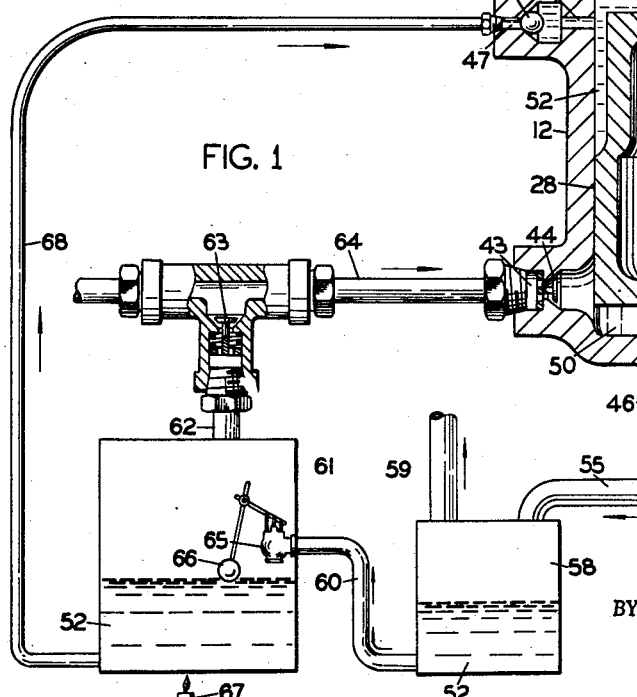
FIG. 1
INVENTORS
ROLLIN J. McCRORY
JOSEPH H. McNINCH, JR.
ALBERT K. DAGGETT
JOHN B. DAY, JR.
BY
ATTORNEY

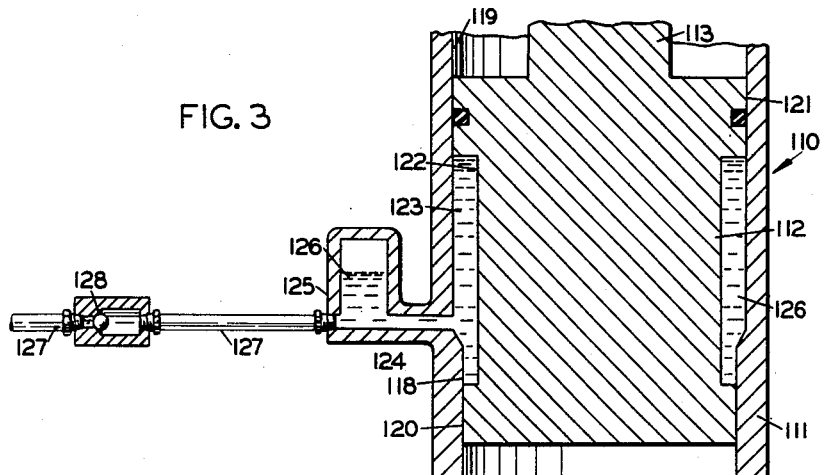
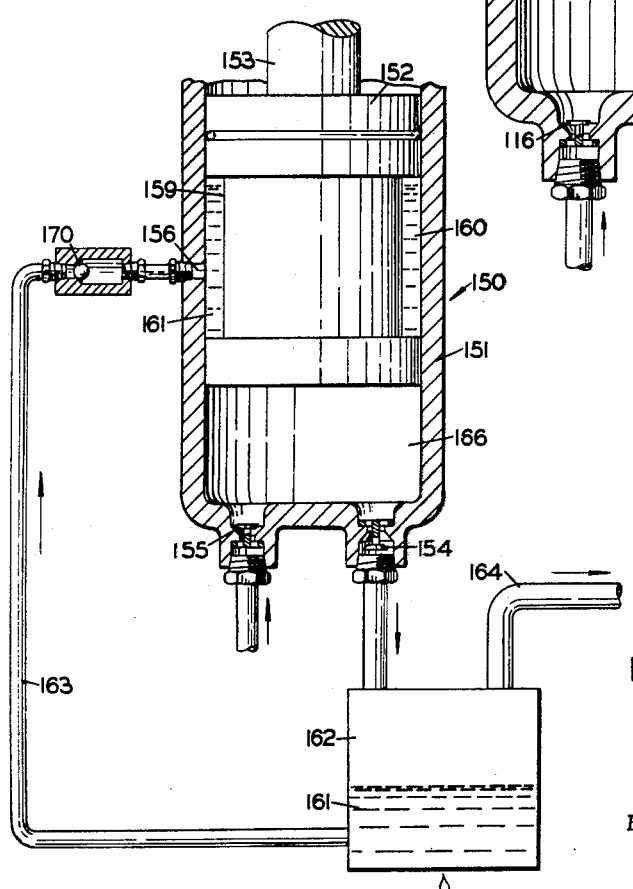

INVENTORS
ROLLIN J. McCRORY
JOSEPH H. McNINCH, JR.
ALBERT K. DAGGETT
JOHN B. DAY, JR.

By Gray, Mase and
Dunson, Attorneys

United States Patent Office 3,146,940
Patented Sept. 1, 1964

3,146,940
REVERSE LEAKAGE SEAL FOR
RECIPROCATING PARTS
Rollin J. McCrory, Worthington, and Joseph H. McNinch, Jr., Columbus, Ohio, Albert K. Daggett, Fullerton, Calif., and John B. Day, Jr., Columbus, Ohio, assignors, by mesne assignments, to The Battelle Development Corporation, Columbus, Ohio, a corporation of Delaware
Filed Apr. 8, 1960, Ser. No. 20,870
4 Claims. (Cl. 230—203)

This invention relates to a seal for rapidly reciprocating parts. More particularly, it relates to a liquid-type seal for the prevention of fluid flow around the edges of rapidly reciprocating parts as one moves within the other. This invention is a continuation-in-part of our copending application "Reverse Leakage Seal for Reciprocating Parts," Serial No. 705,334, filed December 26, 1957, now abandoned, and includes the invention therein and a number of improvements thereon.

One of the most frequently found uses of seals around reciprocating parts is in internal-combustion engines and in positive displacement pumps and compressors. Seals frequently used at the peripheral edges of pistons where contact is made with a cylinder wall are steel piston rings, packings of felt or rope, and O-rings. These are, of course, satisfactory in many and most applications. However, in those applications where the pressure differential between one side of the piston and the other is high and the rate of reciprocation is high, the problem of sealing is very difficult. Also, in certain installations where the operative fluid on the high pressure side of the piston should not be lost because of the expense involved in maintenance and replacement, the problem of providing an adequate seal is most important. When these conditions are combined, i.e., in installations where the pressure differential is high, the rate of reciprocation is high, and the prevention of loss is very important, the provision of an adequate seal is most critical and may be the difference between success and failure of a unit for a particular application.

One such instance is found in the problem of sealing a refrigerant-gas compressor that is operatively connected to, and may be integral with, a free-piston internal-combustion engine. Free-piston internal-combustion engines may operate at a high cyclic rate up to 4000 cycles per minute. When constructed in conjunction with a gas compressor, a free-piston engine imparts the same rate to the compressor piston. When a free-piston-engine-actuated refrigerant-gas compressor, hereinafter referred to as a free-piston engine compressor, is used in the refrigeration system of an air-conditioning unit or other similar refrigeration system, it is important that the refrigerant gas loss be held to a very small figure so that the system need not be charged oftener than once each year and preferably not oftener than every five years.

It has been found that ordinary seals such as piston rings, O-rings, and packings are not suitable as seals for the compressor piston in a free-piston engine compressor, because of either leakage, premature failure, or excessive friction.

This invention comprises sealing apparatus and a sealing method for the piston of a free-piston engine compressor, or other rapidly reciprocating parts, that provide for withstanding the rigors of this type of service. In one embodiment of this invention, the piston of the compressor is provided with a recess at its outer peripheral surface in which is disposed a sealing liquid in contact with the cylinder wall. Means is provided to control the pressure of the sealing liquid so that liquid flow takes place toward the compressor chamber. The flowing liquid therefore blocks the passage of gas from the compressor chamber. Means is provided to collect and separate the sealing liquid from the gas and return the sealing liquid at proper pressure to the enclosure formed by the recess in the piston and the cylinder wall.

In another embodiment of this invention, an expansion chamber is provided on the side of the compressor piston opposite the compressor chamber. The expansion chamber reduces the pressure of the compressor fluid in a chamber or stripper gland disposed around the piston rod. A sealing gland containing a sealing liquid also disposed around the piston rod is provided above the stripper gland. Means is provided to control the pressure of the compressor fluid in the stripper gland so that liquid flow takes place toward the stripper gland. The flowing liquid blocks the escape of compressor fluid from the system. Means is provided to collect and separate the sealing liquid from the compressor fluid and return the sealing liquid at proper pressure to the enclosure or sealing gland formed by the piston rod and the recess in the wall surrounding the rod.

It is therefore the broad purpose of this invention to provide a seal which will satisfactorily prevent the passage of fluid around the position of contact between rapidly reciprocating parts. It is another purpose to establish a method of liquid sealant control and movement in a sealing system which will insure that the liquid sealant will flow in the proper direction to block the passage of compressor fluid. It is a further purpose to also provide a method of sealing wherein the pressure in the fluid is controlled so that the pressure in the liquid sealant, when at the surface of contact between the reciprocating parts, is at a pressure higher than the pressure in the compressor chamber a substantially uniform increment throughout the cycle of the compressor.

It is another purpose of this invention to provide apparatus which will control the pressure in the liquid sealant of a refrigerant-gas compressor to an amount that will provide minimum loss of refrigerant gas through the sealing liquid.

It is another purpose of this invention to provide apparatus which will control the pressure of the refrigerant gas of a refrigerant gas compressor above the compressor chamber to an amount below the pressure of the liquid sealant thereby providing a flow of sealing liquid in a direction toward the compressor chamber to provide a minimum loss of refrigerant gas from the compressor system.

Features of this invention are: the way in which a seal is provided without excessive frictional resistance to motion between reciprocating parts; the way in which the seal is constantly replaced and therefore there is no appreciable wear on the seal and no lost time in replacing worn components; the way in which the problem of fluid loss through the liquid sealant is overcome by the control of the sealing liquid pressure; the way in which the problem of fluid loss through the sealing liquid is overcome by the control of the fluid pressure adjacent to the sealing gland; and the way in which a satisfactory seal is provided in a free-piston engine compressor making such a power source conveniently usable in refrigeration systems.

To these and other ends, this invention comprises apparatus for and a method of sealing around reciprocating parts, the preferred form of which is disclosed in the following description and attached drawing. Although the apparatus, structure, and method described and shown in detail refer with particularity to a free-piston engine refrigerant-gas compressor, it is apparent that this invention should not be limited thereto. Many of the significant details of this invention apply with equal qualification to the sealing of reciprocating parts in general. The invention may be used for other purposes, where its features are advantageous.

In the drawings:

FIG. 1 is a sectional elevational view of a compressor having constructed therein one form of the sealing apparatus of this invention, which employs the method of this invention;

FIG. 2 is a sectional view taken along the line 2—2 of FIG. 1;

FIG. 3 is a schematic view of another form of a portion of the sealing apparatus of this invention, which employs the method of this invention;

FIG. 4 is a schematic view of another form of the sealing apparatus of this invention, which employs the method of this invention.

Figure 5:
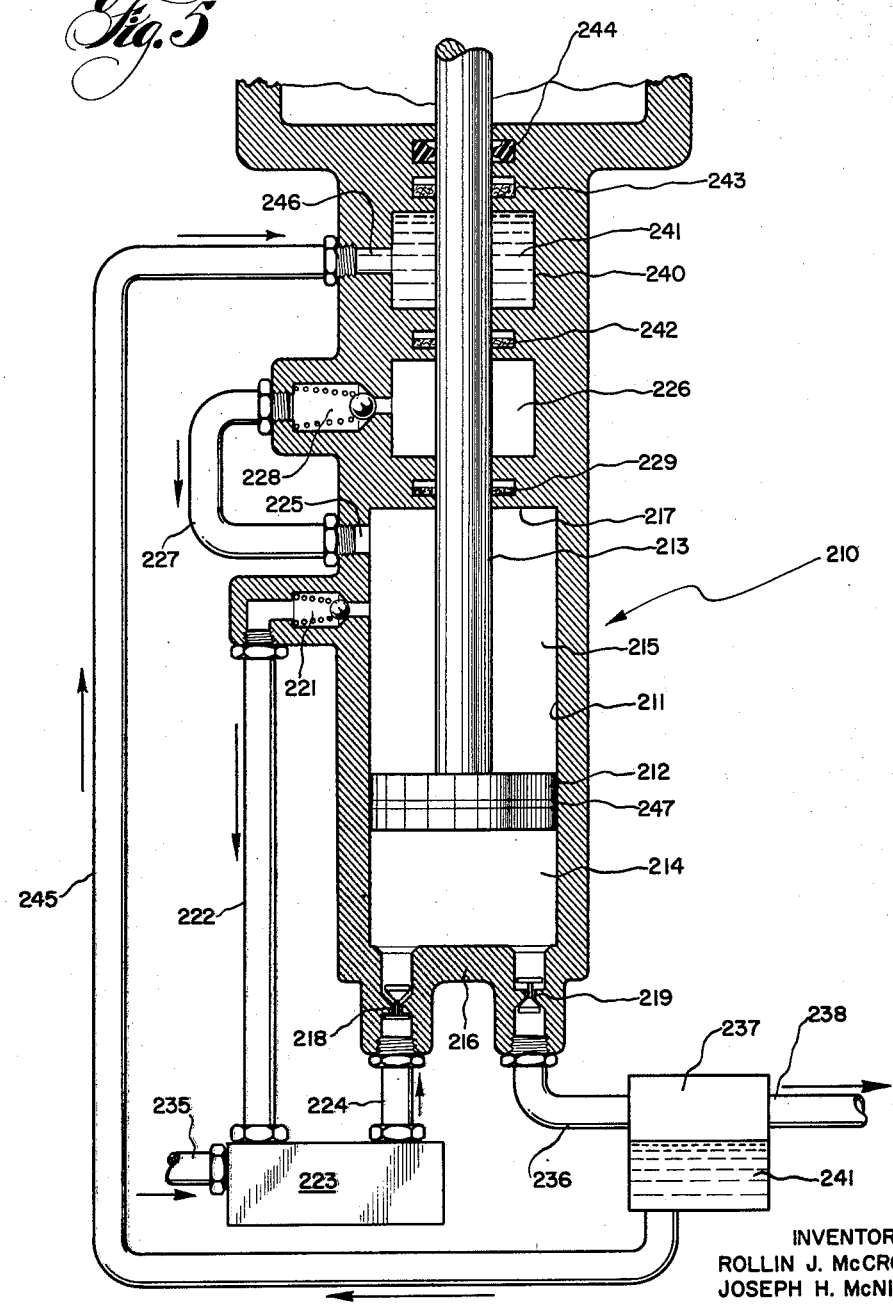
FIG. 5 is a schematic view of another form of the sealing apparatus of this invention which employs the method of this invention.

Referring to FIG. 1, a cylinder 12 forms the outer housing or frame member of a compressor, designated generally as 11. The compressor 11 may be formed integrally as a part of the frame of a compressor actuating device, such as a free-piston engine designated generally as 13. The details of construction of a free-piston engine may vary and in general are well known.

The free-piston engine 13 comprises a combustion cylinder 14 and a larger diameter control cylinder 15, having a piston 16 mounted therein for reciprocable motion. The piston 16 comprises a major diameter portion 17 adapted to reciprocate in the control cylinder 15, and a minor diameter portion 18 constructed to reciprocate in the combustion cylinder 14. The combustion cylinder 14 forms a combustion chamber 19 in conjunction with the minor diameter portion 18. Major diameter portion 17 partitions control cylinder 15 into a pump chamber 23 at one side and a rebound control chamber 20 at the opposite side. Ignition means 21 such as a spark plug may be provided in the head end of the combustion chamber 19.

Auxiliary well-known equipment such as a source of electrical potential for the spark plug 21 and a means of injecting fuel into the combustion chamber 19 are provided, together with proper porting and other construction features.

At the one side of the larger diameter portion 17 of the piston 16, a connecting rod 22 is either integrally formed with the piston 16 or fastened rigidly thereto. The connecting rod 22 extends into the compressor cylinder 12, and in the embodiment of the invention shown in FIG. 1, is formed into a first compressor piston 25. Piston 25 is constructed to reciprocate by sliding fit along an inner wall 26 of cylinder 12. Sealing members 70, which may be conventional piston rings, are provided in grooves on the outer peripheral surface of the first compressor piston 25 to prevent the flow of liquid upward into a chamber 24 above. A second compressor piston 27 having a first major diameter portion 28, an intermediate recessed diameter portion 29, and a minor diameter guide portion 30, is constructed to reciprocate in cylinder 12 by sliding telescoping fit at an adjacent spaced position below the first compressor piston 25. Minor guide diameter portion 30 is received in a bore 31 centrally positioned in the lower face of first compressor piston 25. The outer surface of the guide portion 30 is provided with a seal 32, which may be an O-ring in a groove. A slot 33 is transversely located adjacent the upper end of the minor diameter portion 30. Slot 33 receives a transversely positioned pin 34 which is disposed in a receptive pin bore 35 through opposite sides of piston 25.

The above-described construction, consisting of the first compressor piston 25 and second compressor piston 27, comprise a partition unit whose major diameter has a surface of contact along the inner wall 26 of cylinder 12. The surface of contact has a cavity or an enclosure 40 formed by the wall 26 of cylinder 12, the surfaces of piston 27 including the recess portion 29 and the minor diameter portion 30, the intermediate step portion 41 which is between, and the lower surfaces 42 of the piston 25.

Piston 27 may be hollow, as shown in FIG. 1, if it is desirable to lessen its weight.

Cylinder 12 is constructed with a plurality of apertures, including a suction inlet 43, having an inwardly opening check valve 44; a discharge outlet 45 having an outwardly opening check valve 46; and a sealant inlet 47 having an inwardly opening check valve 48. Inlet 47 is in communication with the enclosure 40 at all time. A sealant liquid 52, which may be oil, is provided in the enclosure 40.

At one end 49, piston 27 forms a compressor chamber 50 in conjunction with the walls 26 and a closure end 51 of cylinder 12.

The free-piston engine 13 operates through the combustion of fuel in the chamber 19 forcing piston 16 downward in the power stroke. The downward stroke compresses refrigerant gas in the compressor chamber 50. At the end of the power stroke, piston 16 is returned to head-end position by energy in the refrigerant gas. Air trapped in central chamber 20 and pump chamber 23 may be vented or utilized to control the stroking of engine 13.

When the minor diameter portion 18 uncovers the exhaust ports on the downward stroke, the pressure in combustion chamber 19 is immediately reduced. While the pressure in chamber 19 decreases, the pressure in compressor chamber 50 remains high as the piston continues downward by momentum. When the downward kinetic energy is consumed the piston reverses and starts up, driven by the gas in compressor chamber 50 at discharge pressure. The pressure in chamber 50 immediately decreases, and as soon as the pressure in compressor chamber 50 decreases sufficiently to create a negative pressure differential across valve 44, valve 44 opens. The opening of valve 44, allows chamber 50 to fill with gas from the suction inlet 43. Substantially at the same time discharge outlet valve 45 closes because the pressure on the discharge side is higher than the side toward chamber 50. The pressure of the gas admitted through valve 44 is high enough to force second compressor piston 27 upward. The upward force is transferred through the liquid in enclosure 40, the first compressor piston 25, and the connecting rod 22. Thus, by means of the suction pressure of the compressor gas, the piston 16 is returned to head-end position on the intake stroke of the engine 13, completing the combustion cycle.

Upon the commencement of the downward stroke of first compressor piston 25, valve 44 closes. During the downward stroke the passage of liquid upward around minor diameter portion 30 is prevented by sealing member 32. Accumulation of pressure in bore 31 above the upper end of portion 30 is prevented by means of a vent 53. When the pressure in chamber 50 becomes greater than the pressure in the discharge line 55, valve 46 opens and gas is discharged from outlet 45 into discharge line 55.

Since the area of piston 27 that is in contact with the sealant liquid 52, normal to the axis of the piston, is less than the area of the piston 27 in contact with the gas in chamber 50, normal to the axis of the piston 27, the pressure of the sealant liquid 52 is higher than the pressure of the gas in chamber 50. Therefore, any leakage between the sliding contact surface of the piston 27 and the wall 26 is oil leakage toward the compression chamber 50. Since any space, no matter how small or large, between the piston 27 and the wall 26 is occupied by oil flowing toward the compressor chamber, the gas in compressor chamber 50 is effectively prevented from leaking and is sealed from passage around the reciprocating components of the apparatus.

Because of suction pressure remaining in compression chamber 50 when the engine is shut off, the piston 16 always comes to rest at head-end position, opposite to that shown in FIG. 1. In order to provide a static seal for the compressor unit during periods when the apparatus is not in operation, a static seal 56, which may be an O-ring, is provided in a groove 57 at the upper end of cylinder 12. When the engine stops at head-end positions, the upper face of piston 25 rests against the seal 56 and prevents the escape of gas until the engine is started and the liquid seal is in operation.

Referring further to FIG. 1, discharge line 55 is connected into the top of an enclosed separator reservoir 58. A compressed gas discharge line 59 is connected to the top of separator 58. At a position near the bottom a conduit 60 is connected from the separator 58 into a stripper 61. The stripper 61 is an enclosed vessel having an outlet conduit 62 at the top in communication with a check valve 63. Check valve 63 is in communication with, and opens toward, the inlet suction line 64 to the inlet suction valve 43 of compressor 11.

At the discharge end of conduit 60 in stripper 61, is a float valve 65 of conventional construction which opens responsively to the liquid level in stripper 61. A source of heat, representatively shown as a flame 67, is provided beneath the stripper 61. From a position near the bottom and below the liquid level, a conduit 68 connects stripper 61 to the sealant liquid inlet 47 on the cylinder 12.

In the operation of the apparatus and method of this invention the sealant liquid passes into the compressor chamber 50. In order that this sealant liquid shall not be wasted the discharge line 55 is connected to the separator 58 wherein the large particles and liquid droplets of sealant liquid 52 collect by gravity at the bottom. The compressed gas is then discharged through the line 59 for whatever use it has been compressed.

In an air compressor this may be the operation of an operating device in which case the sealant liquid, which would probably be oil, is used to advantage to lubricate the operating device. In other instances, the compressor gas may be a refrigerant gas such as Freon 12, and small particles may be carried into the discharge and refrigerator system without harm, being returned in the suction line 64. Therefore, the absorption of the liquid sealant in the compressor gas system is not usually detrimental to the operation of the apparatus and method.

On the other hand, any means by which the refrigerant gas may be carried in the return of the sealant liquid to the enclosure 40 is very detrimental to the operation of the system. The main detriment is the loss of gas, which in the case of a refrigerating system, may not be tolerated in most instances.

In many refrigeration systems the discharge pressure is as high as 150 to 200 p.s.i. absolute; the suction pressure is about 50 p.s.i. absolute; and the temperature of the refrigerant gas may reach as high as 200° F. during the compression stroke. In the normal reciprocation of the piston 27, a film of liquid sealant is deposited on the walls 26 of the chamber 50, and it has been found that a liquid sealant such as oil will dissolve a refrigerant gas, such as Freon 12, at the temperature and pressure existing in the compressor chamber 50. This dissolved gas is carried into the reservoir in the separator 58. Sealant liquid is pumped through the conduit 60 by reason of a high pressure in the separator 58 and discharges into the stripper 61 until the float valve 65 is actuated by the level of the sealant liquid 52 by raising the float 66. The application of heat from the flame source 67 to the liquid 52 in the stripper 61 evaporates the compressor gas from the liquid at the surface into the accumulator chamber above. The gas then passes through the outlet 62 to the pressure differential valve 63. Pressure differential valve 63 is adjusted to open when the gas pressure in the stripper 61 becomes more than about 10 pounds greater than the suction pressure to the compressor.

In a refrigeration system as previously described having a suction pressure of about 50 pounds the pressure differential valve 63 is adjusted to open at 60 p.s.i. absolute. Therefore, the pressure on the liquid sealant in the stripper 61 is maintained at a pressure of about 60 pounds and the dissolved gas may be stripped until only a negligible amount of gas remains in the liquid at this low pressure. The liquid sealant is carried through the conduit 68 to the liquid sealant inlet 47 and is admitted to the enclosure 40 upon the opening of the check valve 48 whenever the pressure in the enclosure 40 is less than the pressure in the stripper 61. The check valve 48 will therefore open whenever leakage past piston 27 lowers the pressure in enclosure 40 sufficiently.

It has been found in the operation of the compressor, if the low pressure stripper 61 is not provided, the oil is carried back to the enclosure 40 carrying dissolved gas with it. A film of oil is deposited on the upper wall 26 of the cylinder 12 by reason of the movement of the piston 25 and the enclosure 40 to its upper-most position. The dissolved gas will be evaporated and lost at the lower pressure condition which exist above the piston 25, when the piston 25 is at its lower-most position. In the refrigeration apparatus of the example the low pressure stripper 61 evaporates the dissolved refrigerant gas, carrying it back to the refrigeration system and preventing its loss from the oil in chamber 24 above enclosure 40.

By means of the apparatus disclosed, and by means of the method of operating the seal so that pressure conditions in the sealant liquid cause flow toward the compressor chamber, in conjunction with the low pressure stripping process step, it has been found that the compressor system may be operated over prolonged periods of time with negligible losses of gas from the system.

Although the apparatus and the method disclosed and shown in FIGS. 1 and 2 are particularly advantageous in their application to the problem of sealing a rapidly reciprocating refrigerant gas compressor, certain of the features of the invention may be utilized in different forms of apparatus and when using different sealing liquids and compressor gasses.

Referring to FIG. 3, a reciprocating piston compressor is schematically shown of a different form although employing the method of the invention. A gas compressor designated generally as 110 comprises a cylindrical frame 111 and a piston 112 constructed to reciprocate therein by sliding fit. The frame 111 may form a part of a free-piston engine or other operating device. Piston 112 may be connected to a free piston or crank arm by means of the upstanding connecting rod portion 113. Piston 112 forms a compressor chamber 114 in conjunction with cylinder 111 and the closure means 115 at one end. An inwardly opening inlet check valve 116 of conventional construction and an outwardly opening discharge check valve 117, also of conventional construction, are provided in communication with the chamber 114.

Cylinder 111 is provided with a minor diameter portion near the compressor end changing to a major diameter portion near the opposite end. Piston 112 is provided with mating sliding contact portions 120 and 121 separated by a recessed portion 122. Recess portion 122 forms an enclosure 123 in conjunction with cylinder 111. At one side of cylinder 111, is provided a conduit 124 in communication with a surge tank 125. A sealant liquid 126 is provided in the enclosure 123, conduit 124, and surge tank 125. A sealant supply line 127 connects with the surge tank 125 through an inwardly opening check valve 128.

As in the apparatus of FIGS. 1 and 2, the compressor 110 is connected to other apparatus requiring the compressed gas and the connection may be made through a separator. The separator may be connected through a stripper to the sealant liquid supply line 127. However, the successful operation of the method and apparatus only requires that the supply line 127 be connected to a source of sealant liquid having a pressure greater than the pressure in the surge tank and enclosure 123 at some time during reciprocation of the piston 112.

In the operation of the apparatus, shown in FIG. 3 as the piston descends on the compression stroke, the volume of the enclosure 123 is decreased by reason of the advancing proportion of the major portion of the cylinder 111 in enclosure 123. The decreases in volume of the enclosure 123 forces the liquid sealant 126 out through the conduit 124 into the surge tank 125. The increase in the amount of sealant liquid in the surge tank 125 decreases the accumulator volume above the liquid 126 in surge tank 125 and, therefore, increases the pressure in the accumulator portion. The increase in the pressure in the surge tank 125 causes the pressure in the liquid 126 to increase progressively with the advance in downward stroke of piston 112. The volume and proportion of the various parts are arranged such that the pressure in the enclosure 123 increases proportionately with the increase in compressor chamber 114 and that the pressure in enclosure 123 is at all times slightly above the pressure in the compression chamber 114. Since the pressure of sealant liquid 126 in the enclosure 123 is always slightly greater than the pressure in the compressor chamber 114, any leakage past the minor diameter portion 120 of the piston 112 will be in the direction of the chamber 114 and will seal the compressor chamber against loss of compressor gas around the sides of the piston 112.

On the upstroke of the piston 112, when the pressure in enclosure 123 becomes lower than the pressure in the stripper, check valve 128 opens and admits sealant liquid to the surge tank 125 and enclosure 123 as necessary for replacement. Sealant liquid which flows past the minor diameter 120 of piston 112 into compressor chamber 114 flows out through the discharge outlet and may be trapped in a separator as necessary in a manner similar to that shown for the seal apparatus of FIG. 1.

FIG. 4, discloses a piston-cylinder apparatus which employs certain features of the method of this invention. In FIG. 4, a compressor designated generally as 150 comprises a cylinder 151 and a piston 152. Cylinder 151 may be connected to or formed as a part of the frame of a driving device such as a free-piston engine, not shown. Piston 152 is provided with a connecting rod portion 153 (partially shown) at one end. Connecting rod portion 153 is connected to an actuating mechanism of the driving device.

Cylinder 151 is provided with an outwardly opening discharge valve 154 and an inwardly opening suction valve 155 each of which may be connected in apparatus of the type shown in FIG. 1 or in apparatus of the type shown in FIG. 4. An inlet 156 for a sealant liquid 161 is provided in one side of cylinder 151.

Piston 152 is provided with annular extremity portions which reciprocate in piston 151 by sliding fit. A central recessed portion 159 provides, in conjunction with cylinder 151, an enclosure 160, which is filled with the sealant liquid 161.

In those installations where the loss of compressor gas by being dissolved in the liquid sealant, is not a critical factor, such as in an air compressor, the compressor discharge outlet 154 may be connected to a separator 162 which is in communication by means of a line 163 to the sealant liquid inlet 156. A check valve 170 is provided in the line 163 and is positioned to open toward inlet 156. Separator 162 is also provided with a compressor gas discharge line 164. Flow is in the direction indicated by the arrows in FIG. 4. Heat from a source 165 may be applied beneath separator 162 to facilitate the separation of compressor gas and liquid sealant.

The apparatus shown in FIG. 4 applies the sealing method of this invention in the following manner. On the down stroke of the piston 152, gas is compressed in the chamber 166 and is forced into the separator 162. The pressure of the liquid sealant 161 which is present in the reservoir of the separator 162, in the line 163, and the enclosure 160 is therefore maintained at the compressor discharge pressure during operation. At the beginning of the down stroke of piston 152, the pressure in chamber 166 is at the suction pressure of the gas which has been admitted through suction inlet valve 155 on the up stroke. As the piston 152 progresses downward the pressure increases to compressor discharge pressure. During that period of the stroke when the pressure in compressor chamber 166 is equal to compressor discharge pressure and to the pressure of the liquid sealant 161, the liquid sealant is not forced to flow toward chamber 166. However, during the upward stroke of the piston the pressure of the sealant liquid 161 is higher than the pressure of the compressor gas and flow will positively be induced toward the chamber 166. Flow cannot take place in the opposite direction because of check valve 170 in line 163. Because of the width of the lower contact flange of piston 152, any gas which is wiped toward enclosure 160 during the period when the pressure in chamber 166 is equal to the pressure in enclosure 160, will be wiped back and forced toward chamber 166 during other periods in the stroke.

Factors which have a bearing on producing the proper proportion to provide the required sealant flow conditions are: the ratio of suction pressure to discharge pressure in the compressor, the character of the sliding fit between the piston and the cylinder, and the characteristics of the compressor gas and the sealant liquid.

Referring to FIG. 5, a reciprocating piston compressor is schematically shown and utilizes a still different form of reverse leakage seal. A gas compressor designated generally as 210 comprises a cylinder 211 and a compressor piston 212. Cylinder 211 may be connected to or formed as a part of the frame of a free piston engine, not shown. Piston 212 is provided with a connecting rod portion 213 at one end. Connecting rod 213 is connected to an actuating mechanism of the driving device.

Cylinder 211 is divided by piston 212 into a compression chamber 214 and an expansion chamber 215. Compression chamber 214 is enclosed by piston 212, cylinder wall 211, and end closure 216. Expansion chamber 215 is enclosed by piston 212, cylinder wall 211, and end closure 217. An inwardly opening check valve 218 and an outwardly opening check valve 217, both of conventional construction, are provided in communication with the compressor chamber 214. Expansion chamber 215 is provided with an outwardly opening check valve 221 which communicates with the suction side of the compressor chamber 214 by means of connecting line 222, compressor inlet plenum 223, connecting line 225 and check valve 218. Expansion chamber 215 is also provided with an inlet 225 which communicates with a chamber surrounding connecting rod 213 or stripper gland 226 by means of connecting line 227 and outwardly opening check valve 228. Leakage of gas between stripper gland 226 and expansion chamber 215 along the connecting rod 213 is minimized by means of sealing ring 229.

Refrigerant gas is supplied to the compression chamber 214 from the evaporator through line 235 or from the expansion chamber 215 through line 222 into the compressor inlet plenum 223 through line 224 and valve 218. The refrigerant gas is then pumped from the compressor chamber 214 through valve 219, line 236, separator 237, and then to the condenser through line 238.

Located above and separate from the stripper gland 226 is a sealing gland 240 which also surrounds the connecting rod 213. A sealing liquid 241 is maintained in the sealing gland 240 at a pressure higher than the gas pressure in the stripper gland 226, so that any leakage paths past the connector rod 213 are sealed by the sealing liquid 241. The flow of sealing liquid 241 from the sealing gland 240 is minimized by hydraulic sealing rings 242 and 243 at each end. During shutdown of the unit, seal 244 prevents any loss of refrigerant gas or sealing liquid 241.

The sealing liquid 241 is supplied to the sealing gland 240, at condenser pressure, from the separator 237 through the connecting line 245 and through port 246. When oil is used as the sealing liquid 241, the oil may also be metered through an orifice, not shown, directly into the compressor 210 to lubricate the compressor piston 212. A sealing ring 247 is provided on the piston 212 to prevent gas flow past the piston from compression chamber 214 to expansion chamber 215.

As the piston 212 reciprocates rapidly in cylinder 211, the connector rod 213 also reciprocates. As the rod 213 passes through the sealing gland 240, a film of sealing liquid 241 is deposited on the rod 231. The sealing liquid 241 on rod 213 is immediately reduced in pressure when it reaches the stripper gland 226. Gas dissolved in the sealing liquid 241 at the condenser pressure is given up in the lower pressure of the stripper gland 226. Also some of the sealing liquid 241 in the sealing gland 240 leaks along the piston rod 213 into the stripper gland 226. The sealing fluid and the refrigerant gas are returned to the compression chamber 214 by being pumped through the expansion chamber 215.

On downward movement of the piston 212 gas is forced through valve 219 into the separator 237 at condenser pressure. Since the separator 237 is at condenser pressure the sealing liquid 241 is also supplied to the sealing gland 240 at condenser pressure. Downward movement of the piston also reduces the pressure in the expansion chamber 215. Reduction of the pressure in expansion chamber 215 causes check valve 228 to open, and any refrigerant gas or sealing liquid 241 in stripper gland 226 is drawn into the expansion chamber 215. The pressure in the stripper gland 226 is maintained at a pressure lower than the suction pressure of the compressor by the pumping action of the expansion chamber 215.

On upward movement of the piston, check valve 228 closes as the pressure in the expansion chamber 215 rises. When the pressure in the expansion chamber 215 exceeds the pressure from the suction side of the compressor, check valve 221 opens and the gas and sealing liquid 241 previously received from the stripper gland 226 on the down stroke of the piston are discharged into line 222. The mixture of sealing liquid 241 and refrigerant gas in line 222 is eventually drawn into the compressor inlet plenum 223 and from there into the compressor chamber 214, and subsequently, is discharged through valve 217 into the separator 237 where the cycle repeats itself. In the case where oil is used as a sealing liquid and is also used to lubricate the piston 212, lubricating oil collecting in the compressor chamber 214 is also forced through the valve 217 back to the separator 237.

Thus, it may be seen that an effective positive fluid seal is maintained by maintaining a flow of sealing fluid 241 from the sealing gland 240 along the piston rod 213 so that refrigerating gas in the compressor 210 does not escape from the refrigerant system.

While the foregoing construction constitutes the preferred embodiment of the device shown in FIG. 5, it is apparent that similar results may be achieved by various other constructions. For example, instead of check valve 228 between expansion chamber 215 and the stripper gland 226 a recess or port in piston rod 213 may be constructed to allow communication between the expansion chamber 215 and the stripper gland 226 when the expansion chamber 215 is at its greatest volume and the compression chamber 214 at its least volume. In like manner a port or recess along the cylinder wall 211 may be substituted for check valve 221, the recess or port providing communication between expansion chamber 215 when it is at its least volume and compression chamber 214 when it is at its maximum volume.

In addition, the pressure of the sealing liquid may be greatly reduced in the construction of FIG. 5 since great advantage is obtained from the stripping action of stripper gland 226. Means other than the compressor could be used to pressurize the sealing liquid.

Each of the apparatuses shown utilizes the basic method of this invention which comprises the following steps: confining a sealing liquid at the surface of contact between rapidly reciprocating parts, regulating the pressure of the sealing liquid to a value higher than the pressure of a fluid at one side of one of the parts for a sufficiently long period to provide greater sealing liquid flow towards said fluid than away from said fluid, collecting the sealing liquid in the fluid, separating the sealing liquid from the fluid, and returning the sealing liquid to the contact position.

In the forms of apparatus shown in FIGS. 1, 2, 3 and 5, the sealing liquid pressure is maintained higher than the fluid pressure at all times. Thus, the pressure of the sealing liquid is maintained at a value higher than the pressure of the fluid for a time sufficiently long to provide flow toward the fluid. In the form of apparatus shown in FIG. 4 the pressure of the sealing liquid is not maintained higher than the fluid pressure at all time, but is maintained at a higher pressure sufficiently long to provide sealing liquid flow towards said fluid during a portion of the stroke.

It will be understood, of course, that, while the forms of the invention herein shown and described constitute the preferred embodiments of the invention, it is not intended herein to illustrate all the possible equivalent forms or ramifications of the invention. It will also be understood that the words used are words of description, rather than of limitation, and various changes, such as changes in shape, relative size, and arrangement of parts may be substituted without departing from the spirit and scope of the invention herein disclosed.

What is claimed is:

1. A sealing construction for rapidly reciprocating positive-displacement gas compressors, comprising: a frame enclosing a first cavity, a second cavity separate from said first cavity and a third cavity separate from said first and second cavities; a piston reciprocal in said first cavity by sliding fit and dividing said first cavity into an expansion chamber and a compression chamber, said chambers having oppositely actuated check valve means therein to provide fluid pumping action on reciprocation of said piston; a rod connecting said piston to an activating means, passing through said expansion chamber, said second cavity and third cavities and engaging said frame by sliding fit; first communication means between said second cavity and said expansion chamber whereby said fluid pumping action of said expansion chamber reduces the pressure in said second cavity; second communication means between said expansion chamber and said compressor chamber whereby said fluid pumping action of said compressor chamber removes fluid from said expansion chamber; third communication means between said third cavity and said compression chamber, including in said third communication means a liquid and gas separator, whereby said fluid pumping action of said compression chamber forces liquid from said separator into said third cavity.

2. A sealing construction for rapidly reciprocating positive-displacement gas compressors, comprising: a frame enclosing a first cylindrical cavity, a second cylindrical cavity separate from said first cylindrical cavity and a third cylindrical cavity separate from said first and second cavities, said first, second and third cylindrical cavities having a common longitudinal axis; a piston reciprocal in said first cylindrical cavity by sliding fit and dividing said first cylindrical cavity into an expansion chamber and a compression chamber, said chambers having oppositely actuated check valve means therein to provide fluid pumping action on reciprocation of said piston; a rod connecting said piston to an activating means, passing through said expansion chamber, said second cavity and third cylindrical cavities, having its longitudinal axis coinciding with said common longitudinal axis of said three cavities, and engaging said frame by sliding fit; first communication means between said second cylindrical cavity and said expansion chamber whereby said fluid pumping action of said expansion chamber reduces the pressure in said second cylindrical cavity; second communication means between said expansion chamber and said compressor chamber whereby said fluid pumping action of said compressor chamber removes fluid from said expansion chamber; third communication means between said third cylindrical cavity and said compression chamber, including in said third communication means a liquid and gas separator, whereby said fluid pumping action of said compression chamber forces liquid from said separator into said third cylindrical cavity.

3. A sealing construction for rapidly reciprocating positive displacement gas compressors having a cylinder and a piston unitary reciprocal therein, having first closure means for one end of said cylinder forming a compressor chamber in conjunction with said cylinder and a contiguous end of said piston, wherein: said cylinder is provided with a second closure means at its opposite end forming an expansion chamber in conjunction with said cylinder and the end of said piston opposite said contiguous end; a connecting rod connected to said piston, passing through said second closure means and connected to an activating mechanism; a first annular chamber disposed about said connecting rod between said expansion chamber and said activating mechanism; first communication means between said first annular chamber and said expansion chamber; a second annular chamber disposed about said connecting rod between said first annular chamber and said activating mechanism and containing a sealing liquid at a pressure sufficient to provide fluid flow from said second annular chamber toward first said annular chamber during reciprocation of said connecting rod; a separator in communication with the high pressure outlet of said compressor and said second annular chamber; a first check valve in said first communication means to allow gas flow from said first annular chamber to said expansion chamber and to prevent gas flow from said expansion chamber to said first annular chamber; second communication means between said expansion chamber and the suction inlet of said compressor; a second check valve in said second communication means to allow gas flow from said expansion chamber to said compression chamber and to prevent gas flow from said compression chamber to said expansion chamber.

4. A seal for the prevention of fluid passage around rapidly reciprocating parts, comprising: a cylinder having closures at both ends; a piston reciprocal in said cylinder by sliding fit and dividing said cylinder into an expansion chamber and a compression chamber, said chambers having oppositely actuated check valve means therein to provide fluid pumping action on reciprocation of said piston; a connecting rod between said piston and an activating means and passing through said closure of said expansion chamber; a first annular chamber disposed about said connecting rod between said expansion chamber and said activating means; a second annular chamber disposed about said connecting rod between said first annular chamber and said actuating mechanism and containing a sealing fluid at a pressure greater than the pressure in said first annular chamber; first communication means between said first annular chamber and said expansion chamber whereby said fluid pumping action of said expansion chamber reduces the pressure in said first annular chamber; second communication means between said expansion chamber and said compressor chamber whereby said fluid pumping action of said compressor chamber removes fluid from said expansion chamber; and third communication means between said second annular chamber and said compression chamber whereby said fluid pumping action of said compression chamber forces liquid into said second annular chamber.

References Cited in the file of this patent

UNITED STATES PATENTS

| | | |
|---|---|---|
| 233,736 | De La Vergne | Oct. 26, 1880 |
| 504,093 | Schmaltz | Aug. 29, 1893 |
| 757,297 | Goosemann | Apr. 12, 1904 |
| 1,964,932 | Stoesling et al. | July 3, 1934 |
| 2,143,637 | Vollmann | Jan. 10, 1939 |
| 2,330,781 | Langmyhr et al. | Sept. 28, 1943 |
| 2,367,185 | Cary | Jan. 16, 1945 |

FOREIGN PATENTS

| | | |
|---|---|---|
| 19,633 | Great Britain | Oct. 2, 1901 |
| 16,584 | Great Britain | July 11, 1914 |